(12) United States Patent
Nanjappan

(10) Patent No.: US 10,906,776 B2
(45) Date of Patent: Feb. 2, 2021

(54) WORK AREA TECHNICIAN WARNING SYSTEM

(71) Applicant: Otis Elevator Company, Farmington, CT (US)

(72) Inventor: Ezhil Nanjappan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 563 days.

(21) Appl. No.: 15/691,310

(22) Filed: Aug. 30, 2017

(65) Prior Publication Data

US 2019/0062109 A1 Feb. 28, 2019

(51) Int. Cl.
| | | |
|---|---|---|
| *B66B 5/00* | (2006.01) | |
| *G08B 21/02* | (2006.01) | |
| *H04W 4/02* | (2018.01) | |
| *H04W 4/80* | (2018.01) | |

(52) U.S. Cl.
CPC ............ *B66B 5/005* (2013.01); *B66B 5/0056* (2013.01); *G08B 21/02* (2013.01); *H04W 4/023* (2013.01); *H04W 4/80* (2018.02)

(58) Field of Classification Search
CPC ..... H04W 4/029; H04W 4/021; H04W 4/023; H04W 4/02; H04W 4/025; H04W 4/38; H04W 40/20; H04B 10/60; H04B 1/02; G08C 2201/91; G08C 2201/93; G01R 33/072; F16P 3/147; F16P 3/14; F16P 3/142; F16P 3/16; F16P 3/145; F16P 3/144; E01F 15/148; E01F 9/608; H04R 29/008; H04R 2499/11; H04R 29/00; B66B 5/0025; B66B 5/005; B66B 5/0056; B66B 5/0087

See application file for complete search history.

(56) References Cited

U.S. PATENT DOCUMENTS

| | | |
|---|---|---|
| 6,727,805 B2 | 4/2004 | Hollister et al. |
| 7,426,981 B2 | 9/2008 | Bacellar et al. |
| 8,042,846 B2 | 10/2011 | Ruggerio |

(Continued)

FOREIGN PATENT DOCUMENTS

| | | |
|---|---|---|
| CN | 203529637 U | 4/2014 |
| CN | 205558529 U | 9/2016 |

(Continued)

OTHER PUBLICATIONS

Aoli Wholesale Center, "Door Stop Wedge Alarm for Home and Travel", available at: http://www.allspycameras.com/product/en/china-Door-Stop-Wedge-Alarm-for-Home-Travel.html, 4pgs.

(Continued)

*Primary Examiner* — Marlon T Fletcher
(74) *Attorney, Agent, or Firm* — Cantor Colburn LLP

(57) ABSTRACT

A method of warning a technician is provided. The method comprising: detecting a wireless signal emitted by at least one of a sensor and a user device; determining a distance between the sensor and the user device in response to the wireless signal; determining whether the user device is within a work area in response to the distance between the sensor and the user device; and conveying safety instructions through an application installed on the user device when the user device is determined to be within the work area.

17 Claims, 4 Drawing Sheets

(56) References Cited

U.S. PATENT DOCUMENTS

| | | | |
|---|---|---|---|
| 8,556,043 B2 | 10/2013 | Mangini et al. | |
| 9,027,972 B2 | 5/2015 | Muramatsu et al. | |
| 9,213,473 B2 | 12/2015 | Hovi et al. | |
| 9,359,171 B1 | 6/2016 | Nowel | |
| 9,403,663 B2 | 8/2016 | Dellarippa et al. | |
| 2013/0168191 A1* | 7/2013 | Mason | B66B 5/0012 187/392 |
| 2014/0076667 A1 | 3/2014 | Henseler | |
| 2014/0262629 A1* | 9/2014 | Toutaoui | B66B 1/3461 187/393 |
| 2016/0047149 A1 | 2/2016 | Bertelli et al. | |
| 2016/0106174 A1 | 4/2016 | Chung et al. | |
| 2016/0186470 A1 | 6/2016 | Finley et al. | |
| 2016/0363663 A1* | 12/2016 | Mindell | G01S 5/021 |
| 2017/0137256 A1 | 5/2017 | Meguro et al. | |
| 2017/0233221 A1* | 8/2017 | Geisshusler | B66B 5/0031 187/247 |
| 2018/0077546 A1* | 3/2018 | Arunachalam | B60Q 5/006 |
| 2018/0103352 A1* | 4/2018 | Murase | H04W 4/33 |
| 2018/0239010 A1* | 8/2018 | Mindell | G01S 13/878 |
| 2018/0255426 A1* | 9/2018 | Liao | G06F 3/04883 |
| 2019/0062109 A1* | 2/2019 | Nanjappan | B66B 5/0056 |

FOREIGN PATENT DOCUMENTS

| | | |
|---|---|---|
| EP | 2927174 A1 | 10/2015 |
| JP | H02295868 A | 12/1990 |
| JP | 2005132543 A | 5/2005 |
| JP | 2010195530 A | 9/2010 |
| JP | 2014015300 A | 1/2014 |
| JP | 2014133619 A | 7/2014 |
| WO | 2006076818 A1 | 7/2006 |
| WO | 2007018540 A1 | 2/2007 |
| WO | 2008072023 A1 | 6/2008 |
| WO | 2014095511 A1 | 6/2014 |

OTHER PUBLICATIONS

Haven lock, "HAVEN: The Stronger Smarter Home Lock—Haven Lock" available at: https://havenlock.com/, accessed Aug. 28, 2017, 7pgs.

The Extended European Search Report for Application No. 18190470.7-1017; Report Issued dated Jan. 31, 2019; Report Received Date: Feb. 8, 2019; 8 pages.

* cited by examiner

WORK AREA TECHNICIAN WARNING SYSTEM

BACKGROUND

The subject matter disclosed herein relates generally to the field of conveyance systems, and specifically to a method and apparatus for warning a technician working on a conveyance system.

The safety of an elevator technician is paramount when work in an elevator hoistway is being conducted. In certain elevator systems, an elevator technician may need to access a pit of the hoistway or the top of the car for a repair.

BRIEF SUMMARY

According to one embodiment, a method of warning a technician is provided. The method comprising: detecting a wireless signal emitted by at least one of a sensor and a user device; determining a distance between the sensor and the user device in response to the wireless signal; determining whether the user device is within a work area in response to the distance between the sensor and the user device; and conveying safety instructions through an application installed on the user device when the user device is determined to be within the work area.

In addition to one or more of the features described above, or as an alternative, further embodiments may include: activating an alarm on the user device when the user device is determined to be within the work area.

In addition to one or more of the features described above, or as an alternative, further embodiments may include that the safety instructions are at least one of audio, pictorial, and textual.

In addition to one or more of the features described above, or as an alternative, further embodiments may include: determining a location of the user device within the work area.

In addition to one or more of the features described above, or as an alternative, further embodiments may include: adjusting the instructions in response to the location.

In addition to one or more of the features described above, or as an alternative, further embodiments may include that the wireless signal is a Bluetooth signal.

In addition to one or more of the features described above, or as an alternative, further embodiments may include: measuring a strength of the wireless signal, wherein the distance between the sensor and the user device is determined in response to the strength of the wireless signal.

In addition to one or more of the features described above, or as an alternative, further embodiments may include that the work area is an elevator shaft.

In addition to one or more of the features described above, or as an alternative, further embodiments may include that the sensor emits the wireless signal.

In addition to one or more of the features described above, or as an alternative, further embodiments may include that the user device emits the wireless signal.

According to another embodiment, a system for warning a technician is provided. The system comprising: a sensor located within a work area; and an application installed on a user device configured to perform operations comprising: determining a distance between the sensor and the user device in response to a wireless signal emitted by at least one of the sensor and the user device; determining whether the user device is within the work area in response to the distance between the sensor and the user device; and conveying safety instructions through the application when the user device is determined to be within the work area.

In addition to one or more of the features described above, or as an alternative, further embodiments may include that the operations further comprise: activating an alarm on the user device when the user device is determined to be within the work area.

In addition to one or more of the features described above, or as an alternative, further embodiments may include that the safety instructions are at least one of audio, pictorial, and textual.

In addition to one or more of the features described above, or as an alternative, further embodiments may include that the operations further comprise: determining a location of the user device within the work area.

In addition to one or more of the features described above, or as an alternative, further embodiments may include that the operations further comprise: adjusting the instructions in response to the location.

In addition to one or more of the features described above, or as an alternative, further embodiments may include that the wireless signal is a Bluetooth signal.

In addition to one or more of the features described above, or as an alternative, further embodiments may include that the operations further comprise: measuring a strength of the wireless signal, wherein the distance between the sensor and the user device is determined in response to the strength of the wireless signal.

In addition to one or more of the features described above, or as an alternative, further embodiments may include that the work area is an elevator shaft.

In addition to one or more of the features described above, or as an alternative, further embodiments may include that the sensor emits the wireless signal.

In addition to one or more of the features described above, or as an alternative, further embodiments may include that the user device emits the wireless signal.

Technical effects of embodiments of the present disclosure include a system configured to warn a technicians of danger within a work area.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
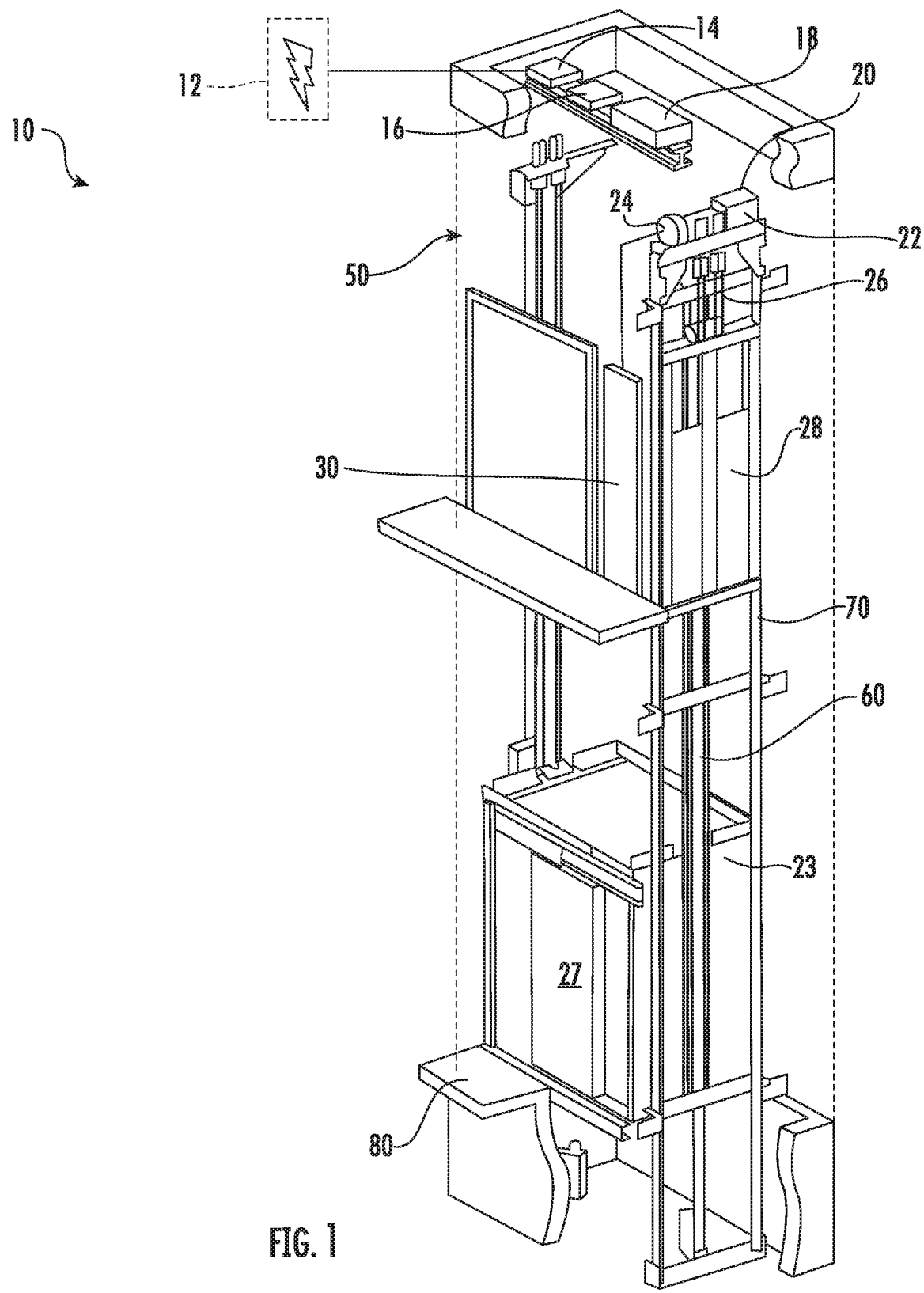
FIG. 1 illustrates a schematic view of an elevator system, in accordance with an embodiment of the disclosure.

FIG. 1 shows a schematic view of an elevator system 10, in accordance with an embodiment of the disclosure. It is understood that while an elevator system is utilized for exemplary illustration, embodiments disclosed herein may be applied to other conveyance systems such as, for example, escalators. With reference to FIG. 1, the elevator system 10 includes an elevator car 23 configured to move vertically upward and downward within a hoistway 50 along a plurality of car guide rails 60. The elevator system 10 may also include a counterweight 28 operably connected to the elevator car 23 via a pulley system 26. The counterweight 28 is configured to move vertically upward and downward within the hoistway 50. In addition, elevator systems moving laterally and/or diagonally may also be used. In one embodiment, the elevator car 23 may move laterally. In another embodiment, the elevator car 23 may move diagonally. The counterweight 28 moves in a direction generally opposite the movement of the elevator car 23, as is known in conventional elevator systems. Movement of the counterweight 28 is guided by counterweight guide rails 70 mounted within the hoistway 50. The elevator car 23 also has doors 27 to open and close, allowing passengers to enter and exit the elevator car 23 at a floor 80.

The elevator system 10 also includes a power source 12. The power is provided from the power source 12 to a switch panel 14, which may include circuit breakers, meters, etc. From the switch panel 14, the power may be provided directly to the drive unit 20 through the controller 30 or to an internal power source charger 16, which converts AC power to direct current (DC) power to charge an internal power source 18 that requires charging. For instance, an internal power source 18 that requires charging may be a battery, capacitor, or any other type of power storage device known to one of ordinary skill in the art. Alternatively, the internal power source 18 may not require charging from the AC external power source 12 and may be a device such as, for example a gas powered generator, solar cells, hydroelectric generator, wind turbine generator or similar power generation device. The internal power source 18 may power various components of the elevator system 10 when an external power source is unavailable. The drive unit 20 drives a machine 22 to impart motion to the elevator car 23 via a traction sheave of the machine 22. The machine 22 also includes a brake 24 that can be activated to stop the machine 22 and elevator car 23. As will be appreciated by those of skill in the art, FIG. 1 depicts a machine room-less elevator system 10, however the embodiments disclosed herein may be incorporated with other elevator systems that are not machine room-less or that include any other known elevator configuration. In addition, elevator systems having more than one independently operating elevator car in each elevator shaft and/or ropeless elevator systems may also be used. In one embodiment, the elevator car may have two or more compartments.

The controller 30 is responsible for controlling the operation of the elevator system 10. The controller 30 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 2:
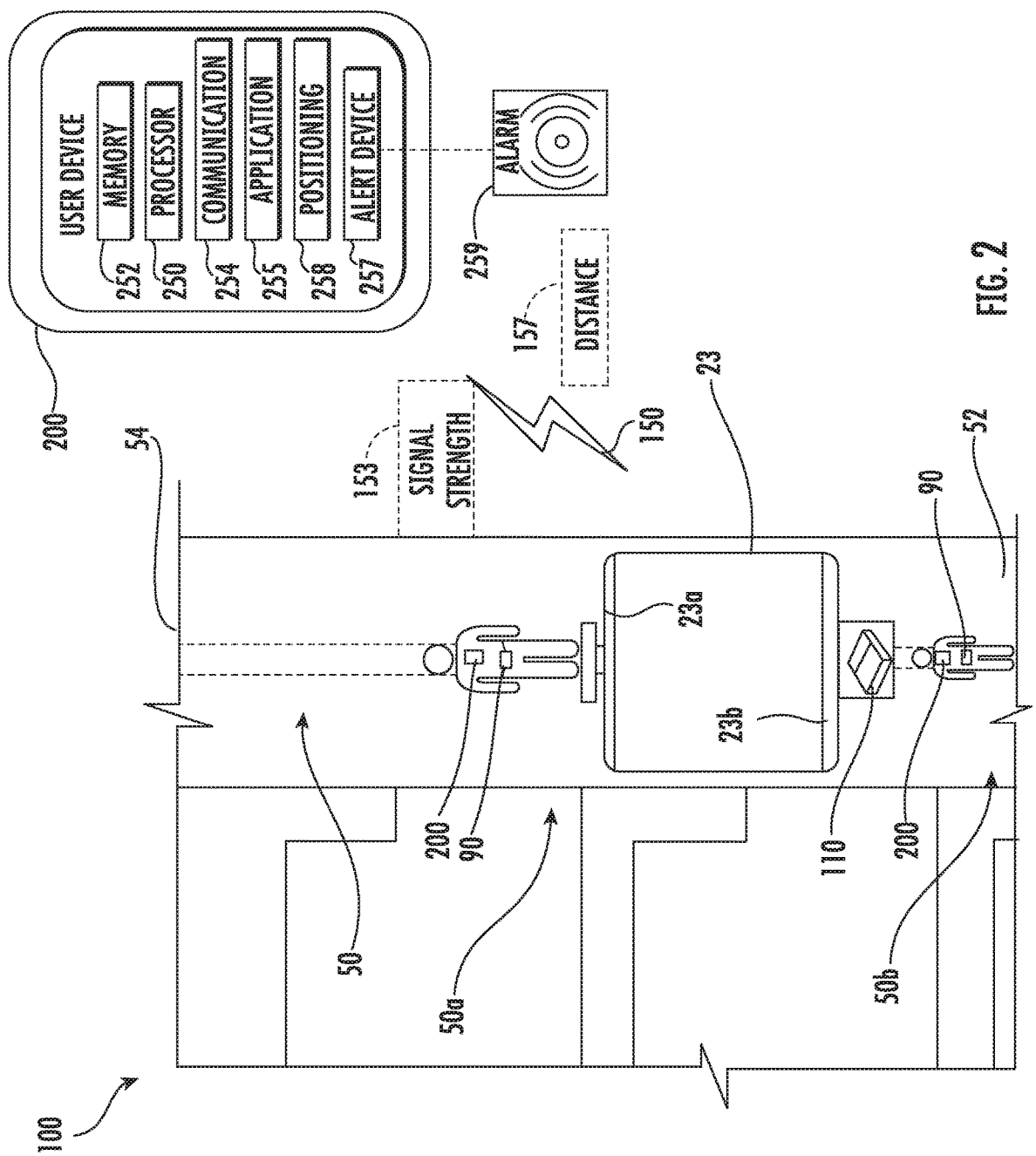
FIG. 2 illustrates a schematic view of an elevator technician warning system, in accordance with an embodiment of the disclosure.

Referring now to FIG. 2 while referencing FIG. 1, FIG. 2 illustrates an elevator technician warning system 100, according to an embodiment of the disclosure. The elevator technician warning system 100, comprises a sensors 110 and a user device 200.

The user device 200 is capable of secure bi-directional communication with the sensor 110. The communication may occur over a wireless network, such as 802.11x (Wi-Fi), short-range radio, cellular, satellite, etc. In an embodiment the communication is Bluetooth. The user device 200 may be a mobile computing device that is typically carried by a person, such as, for example a phone, PDA, smart watch, tablet, laptop, etc. The user device 200 may include a processor 250, memory 252, and communication module 254, as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the user device 200 including executable instructions stored therein, for instance, as firmware. The communication module 254 may implement one or more communication protocols as described in further detail herein. The user device 200 may also include a positioning system 258 configured to determine a location of the user device 200. The positioning system 258 may include but is not limited to a GPS system, a wireless signal triangulation system, a beacon system, and/or a cellular signal triangulation system. The positioning system 258 may be configured to determine a location of at least one of the user device 200. The user device 200 may include an alert device 257 configured to activate an alarm 259. In three non-limiting examples, the alert device 257 may be a vibration motor, audio speaker, and/or display screen. The alarm 259 may be audible, visual, haptic, and/or vibratory. The user device 200 may also include an application 255. Embodiments disclosed herein, may operate through the application 255 installed on the user device 200, discussed further below. In a non-limiting example, the user device 200 may belong to an elevator technician.

The sensor 110 may be a transceiver configured to send and/or receive a wireless signal 150. The sensor 110 is configured to detect a distance 157 between the user device 200 and the sensor 110. The distance 157 between the sensor 110 and the user device 200 may be detected using a strength 153 of the wireless signal 150. The sensor 110 may project a wireless signal 150 and the user device 200 may determine the distance 157 between the user device 200 and the sensor 110 in response to the strength 153 of the wireless signal 150. In an alternative embodiment, the wireless device 200 may project a wireless signal 150 and the sensor 110 may determine the distance 157 between the user device 200 and the sensor 110 in response to the strength 153 of the wireless signal 150. For example, the closer the user device 200 and the sensor 110 get to each other the greater the strength 153 of the wireless signal 150, whereas the further the user device 200 and the sensor 110 get from each other the weaker the strength 153 of the wireless signal 150. It is understood, that there are other methods to determine distance 157 between the user device 200 and the sensor 110 and the embodiments disclosed herein are not limited to determining the distance 157 via signal strength 153 of the wireless signal 150.

The sensor 110 is located in a selected location on an elevator car 23 within a hoistway 50. In an embodiment, the selected location is a bottom 23b of the elevator car 23. As seen in FIG. 2, the sensor 110 may be affixed to 110 a bottom 23b of the elevator car 23. In an embodiment, the sensor 110 includes an adhesive element that allows the sensor 110 to be adhered to the elevators car 23, such as, for example, a sticker. The selected location may vary as long as the selected location is known and the dimensions of the elevator car 23 are known. The mobile device is configured to be worn/carried by an elevator technician 90 entering the hoistway 50. In one embodiment, there may be one or more sensors 23.

Identifying the presence of a sensor and knowing the distance 157 between the sensor 110 and the user device 200 allows the application 255 of the user device 200 to determine when the user device 200 has entered the hoistway 50. Further, knowing the distance 157 between the sensor 110 and the user device 200 allows the application 255 of the user device 200 to determine where the user device 200 is located in the hoistway 50, such as, for example, in the elevator pit 50b or on top 23a of the elevator car 23 at an upper elevator shaft location 50a. An elevator technician 90 may enter physical attributes into the application 255 (ex: height) and the application 255 may determine if the elevator technician 90 is in danger of striking a top ceiling 54 of the hoistway 50 if they are standing on the top 23a of the elevator car 23 in response to the physical attributes and the distance 157 between the sensor 110 and the user device 200. The application 255 may also determine if the elevator technician 90 is in danger being struck by the bottom 23b of the elevator car 23 if they are standing on the bottom 52 of the hoistway 50 in response to the physical attributes and the distance 157 between the sensor 110 and the user device 200. The alarm 259 may be activated on the user device 200 if the application 255 determines that the elevator technician 90 may be in danger.

Figure 3:
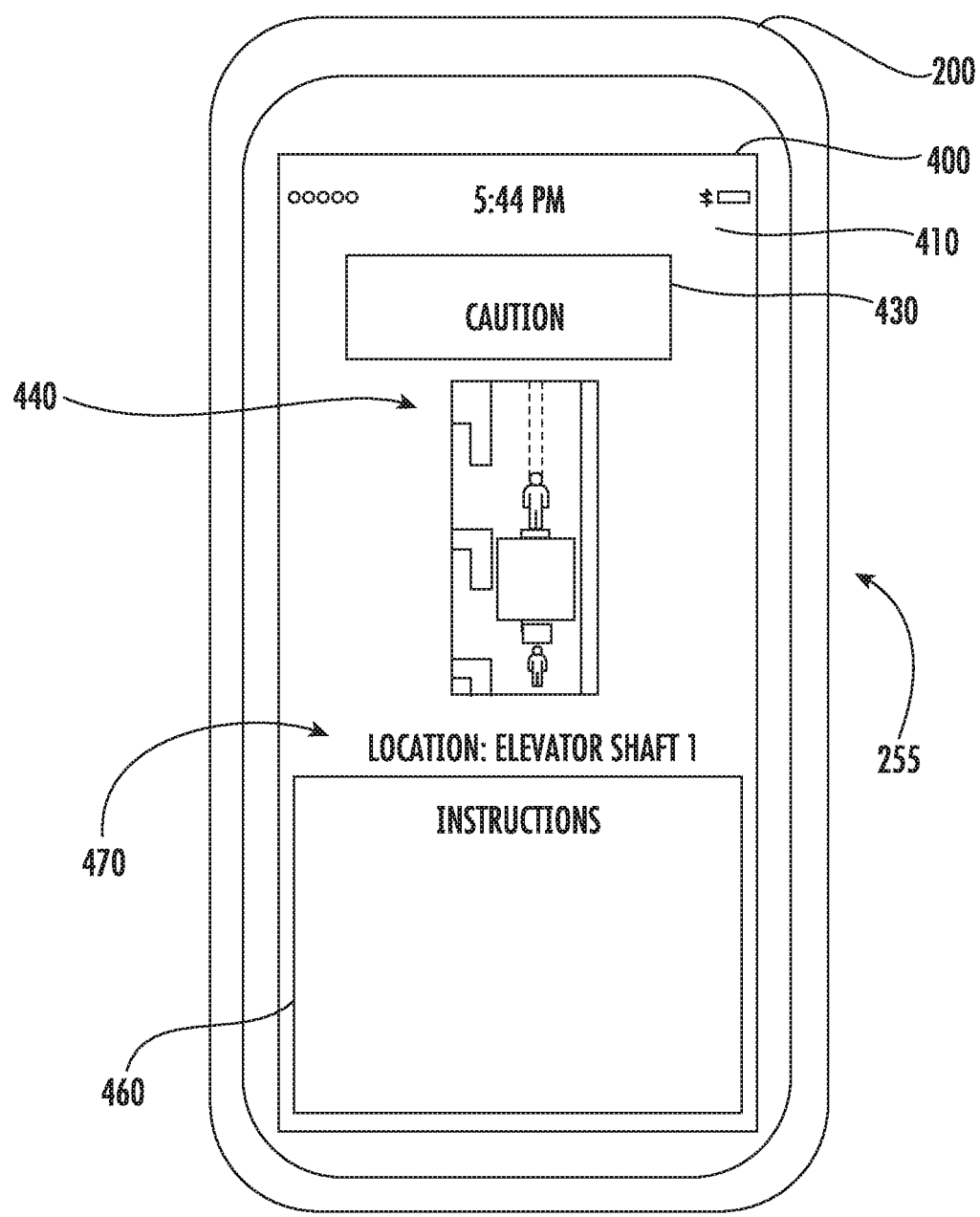
FIG. 3 depicts a user interface in accordance with an embodiment of the disclosure.

Referring now to FIG. 3 with continued reference to FIGS. 1 and 2. FIG. 3 depicts an example user interface 400 on either the user device 200 through the application 255. When using the application 255 the user interface 400 may display a status screen 410, as shown in FIG. 3. The status screen 410 may display a CAUTION alert 430, a pictorial alert 440, a location status 470, and safety instructions 460.

The CAUTION alert 430 may illuminate when the application 255 has determined that the user device 200 has entered an elevator shaft 50. The application 255 may automatically open on the user device 200 when it is determined that the user device 200 has entered the elevator shaft 50. An alarm 259 may activate when it is determined that the user device 200 has entered the elevator shaft 50. A CAUTION alert 430 may strobe/blink repeatedly when it is determined that the user device 200 has entered the elevator shaft 50. The CAUTION alert 430 is intended to capture the attention of the elevator technician 90 once they have entered the elevator shaft 50. Further, the pictorial alert 440 may display a picture of where the user device 200 is determined to be within the elevator shaft 50. The pictorial alert 440 may show a picture of the elevator technician 90 in relation to the elevator car 23. For example, the elevator technician 90 may be shown on top 23a of the elevator car 23 at the upper elevator shaft location 50a or the elevator technician 90 may be shown in the pit 50b of the elevator shaft 50.

The location status 470 depicts a location of the user device 200. In an example, the location status 470 may state the specific elevator shaft where the user device 200 is located. In another example, the location status 470 may state the geographical location of the user device 200. In yet another example, the location status 470 may depict whether the user device 200 is within the elevator shaft, such as, for example the second floor.

The safety instructions 460 may be shown on the user device 200 and/or audibly read aloud when it is determined that the user device 200 has entered the elevator shaft 50. The safety instructions 460 serve as a reminder to technicians of how to work safely in the elevator shaft 50. The safety instructions 460 may be visual instructions showing pictures and/or videos showing how to safely work in the elevator shaft 50. The instructions may also be textual safety instructions showing text describing how to safely work in the elevator shaft 50. The safety instructions 460 may also be audio instructions describing how to safety work in the elevator shaft 50.

Figure 4:
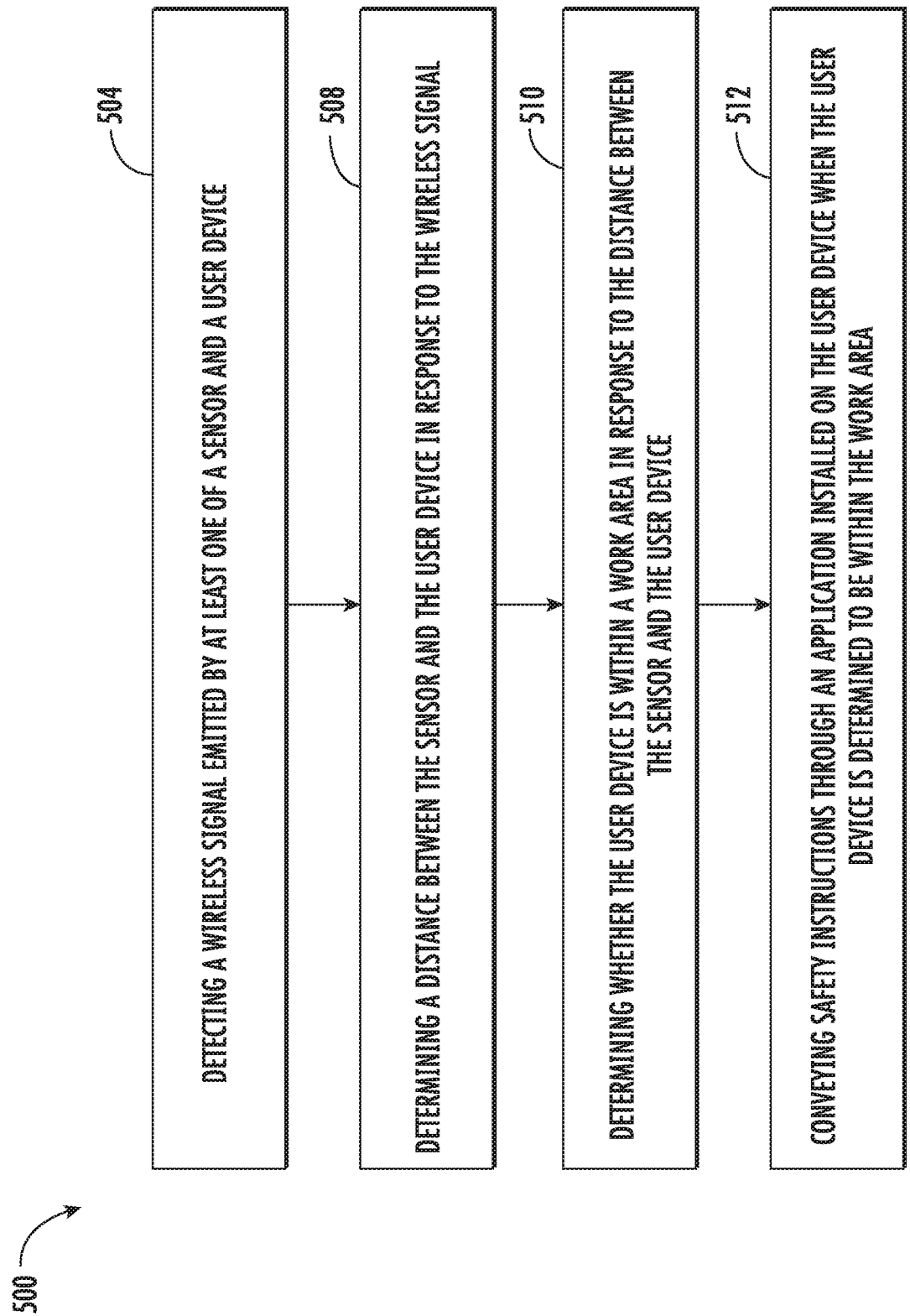
FIG. 4 is a flow chart of a method of preventing a collision within an elevator hoistway, in accordance with an embodiment of the disclosure.

Referring now to FIG. 4 with continued reference to FIGS. 1-3. FIG. 4 shows a flow chart of a method 500 of warning an elevator technician 90, in accordance with an embodiment of the disclosure. It is understood that method 500 may also apply to other technicians working in a work area and the embodiments disclosed herein are not limited to elevator technicians 90 working in an elevator shaft 50. At block 504, a wireless signal 150 emitted by at least one of a sensor 110 and a user device 200 is detected. In one embodiment, the sensor 110 is emitting a wireless signal 150 and the user device 200 is detecting the wireless signal 150. In a second embodiment, the user device 200 is emitting a wireless signal 150 and the sensor 110 is detecting the wireless signal 150. In an embodiment the wireless signal 150 may be a Bluetooth signal. At block 508, a distance 157 between the sensor 110 and the user device 200 is determined in response to the strength 153 of the wireless signal 150. The strength 153 of the wireless signal 150 is measured and the distance 157 between the sensor 110 and the user device 200 may be determined in response to the strength of the wireless signal 150.

At block 510, the application 255 determines whether the user device 200 is within an elevator shaft 50 in response to the distance 157 between the sensor 110 and the user device 200. Further, a location of the user device 200 within the hoistway 50 may also be determined. An alarm 259 may be activated on the user device 200 when the user device 200 is determined to be within the elevator shaft 50. At block 512, safety instructions 460 are conveyed through the application 255 when the user device 200 is determined to be within the elevator shaft 50. The safety instructions 460 may be adjusted in response to the location of the user device 200 within the hoistway 50. For example, the safety instructions 460 may be specific to working in the elevator pit 50b, working on top 23a of the elevator car 23, or any other location within the hoistway 50. The safety instructions 460 may be at least one of audio, pictorial, and textual.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of warning a technician, the method comprising:
    detecting a wireless signal emitted by at least one of a sensor and a user device;
    determining a distance between the sensor and the user device in response to the wireless signal;
    determining whether the user device is within a work area in response to the distance between the sensor and the user device; and
    conveying safety instructions through an application installed on the user device when the user device is determined to be within the work area,
    determining a location of the user device within the work area; and
    adjusting the instructions in response to the location, wherein the work area is an elevator shaft.

2. The method of claim 1, further comprising:
    activating an alarm on the user device when the user device is determined to be within the work area.

3. The method of claim 1, wherein the safety instructions are at least one of audio, pictorial, and textual.

4. The method of claim 1, wherein the wireless signal is a Bluetooth signal.

5. The method of claim 1, further comprising:
    measuring a strength of the wireless signal, wherein the distance between the sensor and the user device is determined in response to the strength of the wireless signal.

6. The method of claim 1, wherein the sensor emits the wireless signal.

7. The method of claim 1, wherein the user device emits the wireless signal.

8. The method of claim 1, wherein the safety instructions are at least one of visual instructions showing how to safely work in the elevator shaft, textual safety instructions showing text describing how to safely work in the elevator shaft, or audio instructions describing how to safety work in the elevator shaft.

9. A system for warning a technician:
    a sensor located within a work area; and
    an application installed on a user device configured to perform operations comprising:
        determining a distance between the sensor and the user device in response to a wireless signal emitted by at least one of the sensor and the user device;
        determining whether the user device is within the work area in response to the distance between the sensor and the user device; and
        conveying safety instructions through the application when the user device is determined to be within the work area;
        determining a location of the user device within the work area; and
        adjusting the instructions in response to the location, wherein the work area is an elevator shaft.

10. The system of claim 9, wherein the operations further comprise:
    activating an alarm on the user device when the user device is determined to be within the work area.

11. The system of claim 9, wherein the safety instructions are at least one of visual instructions showing how to safely work in the elevator shaft, textual safety instructions showing text describing how to safely work in the elevator shaft, or audio A instructions describing how to safety work in the elevator shaft.

12. The system of claim 9, wherein the wireless signal is a Bluetooth signal.

13. The system of claim 9, wherein the operations further comprise:
    measuring a strength of the wireless signal, wherein the distance between the sensor and the user device is determined in response to the strength of the wireless signal.

14. The system of claim 9, wherein the sensor emits the wireless signal.

15. The system of claim 9, wherein: the user device emits the wireless signal.

16. The system of claim 9, wherein the safety instructions are at least one of visual instructions showing how to safely work in the elevator shaft, textual safety instructions showing text describing how to safely work in the elevator shaft, or audio instructions describing how to safety work in the elevator shaft.

17. A method of warning a technician, the method comprising:
- detecting a wireless signal emitted by at least one of a sensor and a user device;
- determining a distance between the sensor and the user device in response to the wireless signal;
- determining whether the user device is within a work area in response to the distance between the sensor and the user device;
- conveying safety instructions through an application installed on the user device when the user device is determined to be within the work area,
- wherein the safety instructions are at least one of visual instructions showing how to safely work in the elevator shaft, textual safety instructions showing text describing how to safely work in the elevator shaft, or audio instructions describing how to safety A work in the elevator shaft.

\* \* \* \* \*